(12) United States Patent
Crawford et al.

(10) Patent No.: US 11,106,625 B2
(45) Date of Patent: Aug. 31, 2021

(54) ENABLING A HADOOP FILE SYSTEM WITH POSIX COMPLIANCE

(71) Applicant: INTERNATIONAL BUSINESS MACHINES CORPORATION, Armonk, NY (US)

(72) Inventors: Catherine H. Crawford, Carmel, NY (US); Nirmit V. Desai, Bangalore (IN); Pranita S. Dewan, White Plains, NY (US); Raghu K. Ganti, Elmsford, NY (US); Ramya Raghavendra, White Plains, NY (US); Mudhakar Srivatsa, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 302 days.

(21) Appl. No.: 15/177,905

(22) Filed: Jun. 9, 2016

(65) Prior Publication Data
US 2017/0154039 A1     Jun. 1, 2017

Related U.S. Application Data

(60) Provisional application No. 62/260,870, filed on Nov. 30, 2015.

(51) Int. Cl.
G06F 16/11     (2019.01)
(52) U.S. Cl.
CPC .................................. *G06F 16/11* (2019.01)
(58) Field of Classification Search
CPC ...... G06F 3/067; G06F 16/182; G06F 3/0604; G06F 16/164; G06F 2221/2141;
(Continued)

(56) References Cited

U.S. PATENT DOCUMENTS 5,960,446 A     9/1999  Schmuck et al.
7,464,125 B1 *  12/2008 Orszag ................ G06F 11/1435
(Continued)

FOREIGN PATENT DOCUMENTS

WO     2015090668     6/2015

OTHER PUBLICATIONS

Xu, Lei, et al., "VSFS: A Verstile Searchable File System for HPC Analytics", 2013, pp. 1-12.
(Continued)

*Primary Examiner* — Angelica Ruiz
(74) *Attorney, Agent, or Firm* — F. Chau & Associates, LLC

(57) ABSTRACT

A distributed file system (DFS) is provided that is configured to store data in a General Parallel File system (GPFS) and interface with a client configured to interface with a HADOOP Distributed File System (HDFS). The DFS includes a first Node; and a plurality of second Nodes including the GPFS. The first Node is configured to convert an HDFS command from the client into a GPFS command, apply the GPFS command to the GPFS to access a GPFS file, format an HDFS data structure to include identifiers of a set of the second nodes storing the GPFS file, a filename of the GPFS file, and an offset into the GFPS file, and send the HDFS data structure to the client. Each of the second Nodes is configured to access the GPFS using a part of the HDFS data structure received from the client.

14 Claims, 10 Drawing Sheets

(58) Field of Classification Search
CPC .... G06F 21/62; G06F 21/6218; G06F 16/245; G06F 3/0653; G06F 2211/1028; G06F 12/109; G06F 16/113; G06F 11/0709
See application file for complete search history.

(56) References Cited

U.S. PATENT DOCUMENTS

| | | | |
|---|---|---|---|
| 9,021,229 | B2 | 4/2015 | Ananthanarayanan et al. |
| 9,881,164 | B1* | 1/2018 | McKay ............... G06F 21/602 |
| 2007/0136385 | A1* | 6/2007 | Abrashkevich ....... G06F 11/366 |
| 2013/0041872 | A1* | 2/2013 | Aizman ............... G06F 16/182 |
| | | | 707/690 |
| 2013/0311480 | A1* | 11/2013 | An ..................... G06F 16/13 |
| | | | 707/741 |
| 2014/0196115 | A1* | 7/2014 | Pelykh ................ G06F 21/554 |
| | | | 726/4 |
| 2015/0113010 | A1* | 4/2015 | Muthyala ......... G06F 17/30076 |
| | | | 707/756 |

OTHER PUBLICATIONS

Patil, Swapnil, et al., "Scale and Concurrency of Giga+: File System Directories With Millions of Files", Fast, Vol. 11, 2011, pp. 1-14.
Mikami, Shunsuke, et al., "Using the Gfarm Style System As a POSIX Compatible Storage Platform for Hadoop Mapreduce Applications", Proceedings of the 2011 IEEE/ACM 12th International Conference on Grid Computing, pp. 181-189, IEEE Computer Society, 2011.

\* cited by examiner

ENABLING A HADOOP FILE SYSTEM WITH POSIX COMPLIANCE

CROSS-REFERENCE TO RELATED APPLICATION

This application claims priority under 35 U.S.C. § 119(e) to U.S. provisional application NO. 62/260,870 filed on Nov. 30, 2015, which is incorporated by reference in its entirety herein.

FIELD OF INVENTION

The present invention relates generally to a method, system and computer readable medium for enabling a Hadoop file system (HDFS) to be POSIX compliant.

BACKGROUND

HDFS is a distributed filesystem. HDFS has a master/slave architecture. An HDFS cluster consists of a NameNode, a master server that manages the file system namespace and regulates access to files by clients. In addition, there are a number of DataNodes, usually one per node in the cluster, which manage storage attached to the nodes that they run on. HDFS is designed to reliably store very large files across machines in a large cluster. It stores each file as a sequence of blocks. The blocks of a file are replicated for fault tolerance. The block size and replication factor are configurable per file. An application can specify the number of replicas of a file. The replication factor can be specified at file creation time and can be changed later. Files in HDFS are write-once and have strictly one writer at any time.

POSIX is an acronym for Portable Operating System Interface, which is family of standard specified by the IEEE Computing Society for maintaining compatibility between operating systems. HDFS is not fully POSIX-compliant, because the requirements for a POSIX-compliant file-system differ from the target goals for a Hadoop application.

Thus, there is need for a mechanism that enables HDFS to be more fully POSIX-compliant, while still obtaining its original target goals.

SUMMARY

According to an exemplary embodiment of the invention, a distributed file system (DFS) is provided that is configured to store data in a General Parallel File system (GPFS) and interface with a client configured to interface with a HADOOP Distributed File System (HDFS). The DFS includes a first Node; and a plurality of second Nodes including the GPFS. The first Node is configured to convert an HDFS command from the client into a GPFS command, apply the GPFS command to the GPFS to access a GPFS file, format an HDFS data structure to include identifiers of a set of the second nodes storing the GPFS file, a filename of the GPFS file, and an offset into the GFPS file, and send the HDFS data structure to the client. Each of the second Nodes is configured to access the GPFS using a part of the HDFS data structure received from the client.

According to an exemplary embodiment of the invention, a method of operating a distributed file system (DFS) to enable a HADOOP client to access a General Parallel File system (GPFS) of the DFS is provided. The method includes: converting, by a first node of the DFS, a HADOOP file system (HDFS) command from the HADOOP client into a GPFS command; applying, by the first node, the GPFS command to the GPFS to access a GPFS file; formatting, by the first node, an HDFS data structure to include identifiers of a set of second nodes of the DFS storing the GPFS file, a filename of the GPFS file, and an offset into the GFPS file; and sending, by the first node, the formatted HDFS data structure to the client.

According to an exemplary embodiment of the invention, a distributed file system (DFS) is provided. The DFS is configured to store data in a General Parallel File system (GPFS) and interface with a client configured to interface with a HADOOP Distributed File System (HDFS). The DFS includes: a first Node storing metadata; and a plurality of second Nodes including the GPF. The first Node is configured to format a HDFS data structure, in response to a HDFS command received from the client for accessing an HDFS file, to include a GPFS filename of a GPFS file, an offset into the GPFS file, and identifiers of a set of the second Nodes storing the GPFS file, using the metadata. Each of the second Nodes is configured to access the GPFS using a part of the HDFS data structure received from the client.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention.

DETAILED DESCRIPTION

Figure 1:
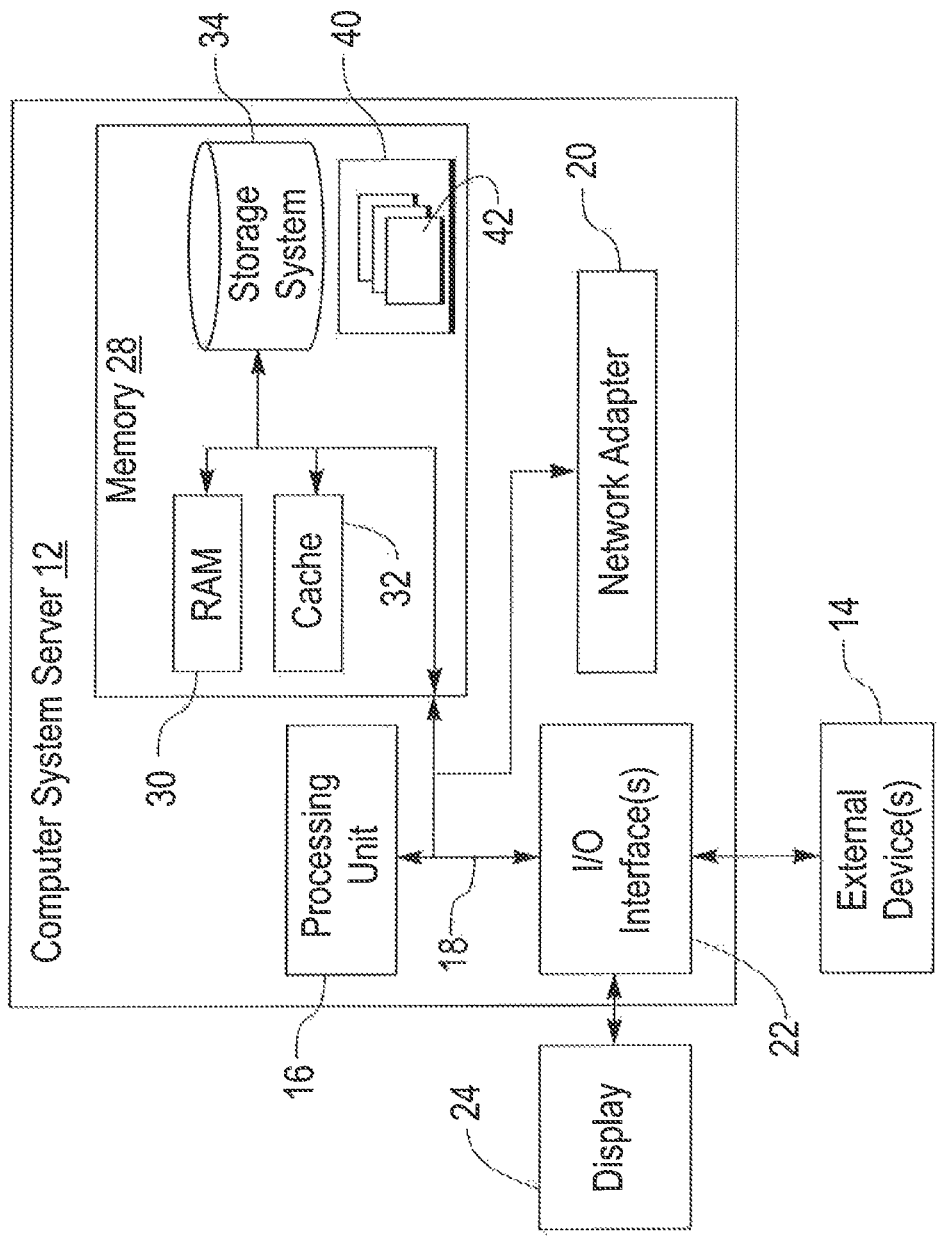
FIG. 1 is a schematic block diagram illustrating a computer system that may be used to implement embodiments of the invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

FIG. 1 illustrates an exemplary computer system/server 12, which is applicable to implementing embodiments of the present invention. Computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
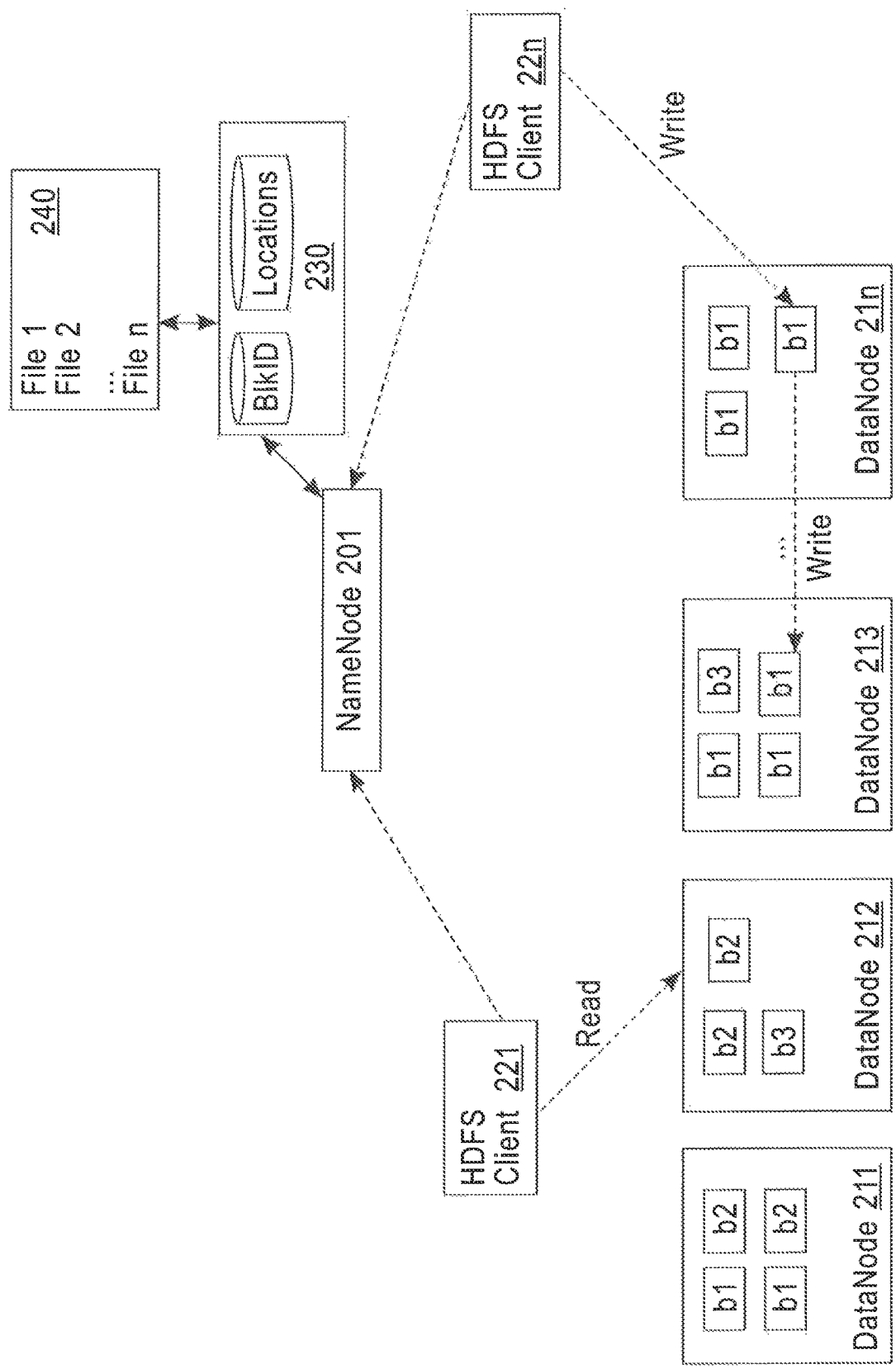
FIG. 2 illustrates a Hadoop Distributed File System (HDFS) for reference.

FIG. 2 illustrates HDFS, which has a master→slave architecture with a single NameNode 201 that manages the file system namespace, and DataNodes 211, 212, 213, . . . , 21n, which manage storage attached to the node (e.g., a computer server) that they run on. The NameNode 201 exposes data topology to HDFS clients 221, . . . , 22n, which read data directly from the DataNodes 211-21n or write data directly to the DataNodes 211-21n once a location (e.g., a given NameNode and a location within the NameNode). The NameNode maintains metadata 230 and a file system 240. HDFS supports write-once-read-many, which means that information once written, cannot be modified, but can be read multiple times. For example, once a block has been written to a file, the block cannot be modified, but additional blocks can be appended to the file. Each block of the file is stored in a set of the DataNodes 211-21n. HDFS supports mirroring or replicating of blocks on other DataNodes for resiliency. For example, FIG. 2 shows a block b1 being written to an n-th DataNode 21n and this block being replicated to a third DataNode 213. The NameNode 201 has file system (FS) namespace operations, and a mapping of blocks in the metadata 230. A DataNode (e.g., 221, 212, 213, . . . , 21n) serves read and write requests from the clients (e.g., 221, . . . , 22n). Each file read is a sequence of block file reads.

In an HDFS read, a client (e.g., 221) indicates to the NameNode 201 it wants to read an HDFS file. For example, the client 221 may send the NameNode 201 an open command with a parameter that identifies the name of the HDFS file to read. The NameNode 201 responds to the client with a Located Block data structure that includes identifiers of all DataNodes that store the HDFS file and block IDs of all blocks in the HDFS file. The client 221 directly requests the blocks of the HDFS file from the identified DataNodes by sending, for each requested block, a part of the Located Block data structure (e.g., the Extended Block data structure) containing a block ID of the requested block to the corresponding DataNode. The DataNode that receives the Extended Block data structure uses the block ID within the received structure to access a corresponding one of the blocks it is storing and responds to the client 221 with data of the accessed block.

In an HDFS append, a client (e.g., 221) indicates to the NameNode it wants to append a block of data to an existing HDFS file. For example, the client 221 may send the NameNode 201 an append command with parameters that identify the name of the HDFS file and the data to append. The NameNode 201 responds to the client 221 with a Located Block data structure including identifiers of all DataNodes that should append a copy of a block containing the data to the HDFS file, a block ID of the block, and the data. The client 221 directly requests the identified DataNodes append the block to the HDFS file by sending a part of the Located Block data structure (e.g., the Extended Block data structure) including the block ID and the data to the identified DataNodes. A DataNode that receives the Extended Block data structure will then use the block ID in the received Extended Block data structure to access a corresponding block of the HDFS file and the data in the received Extended Block data structure to write the data into the accessed block.

General Parallel File System (GPFS) is a high-performance clustered file system developed by IBM. It can be deployed in a shared-disk or on shared-nothing distributed parallel modes. In contrast to HDFS, in a GPFS, metadata is distributed across the nodes rather than being stored on a single NameNode. GPFS also has distributed locking, which allows for full Portable Operating System Interface (POSIX) filesystem semantics, including locking for exclusive file access. GPFS also supports both shared storage and direct attached storage (DAS). GPFS provides a highly clustered architecture, provides concurrent disk access to a global namespace. In GPFS, data is striped across disks, and replication is enabled separately for data and metadata.

Figure 3:
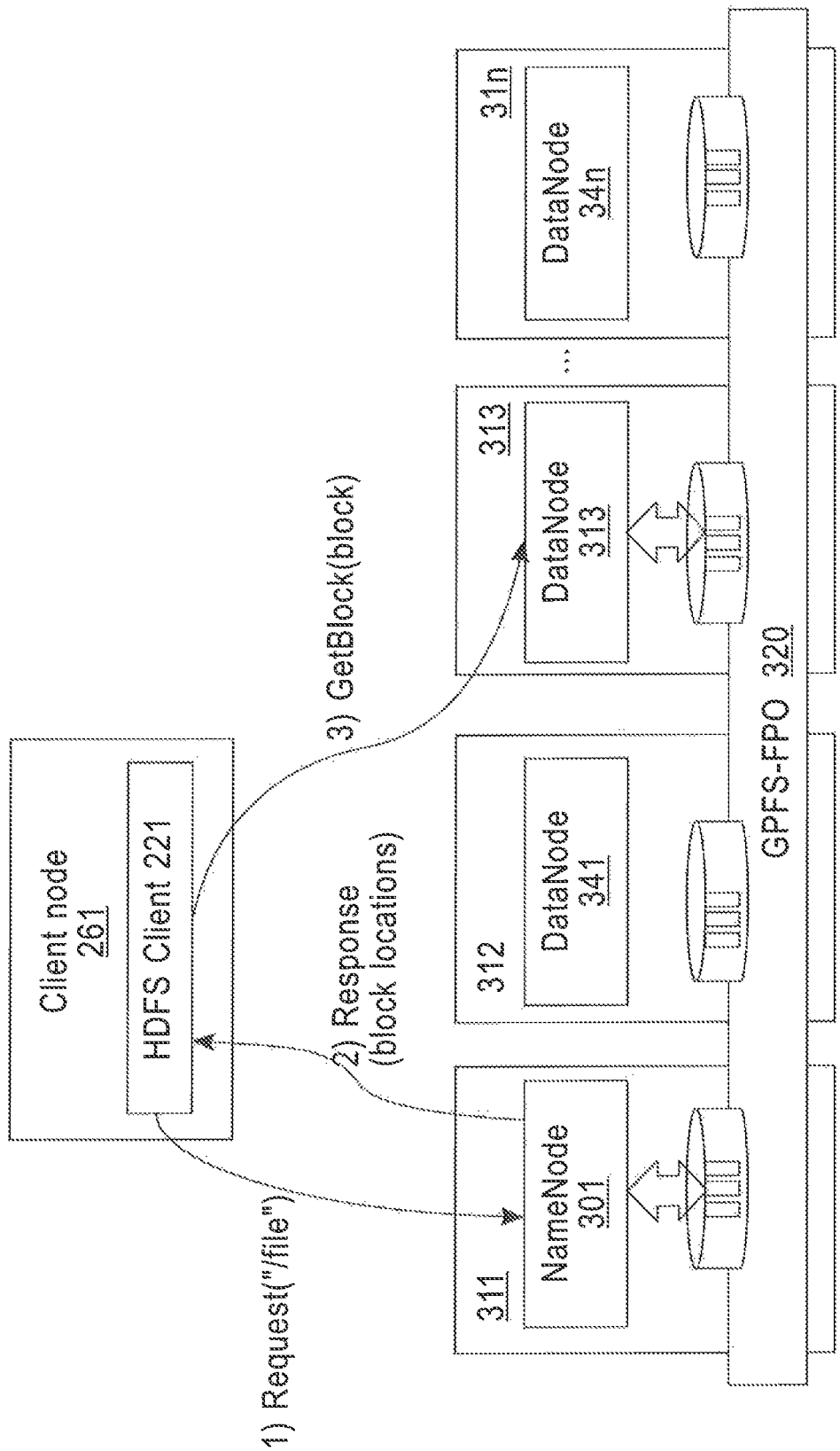
FIG. 3 illustrates an architecture according to an exemplary embodiment of the invention that combines HDFS with elements of a General Parallel File System (GPFS).

FIG. 3 illustrates an HDFS-GPFS architecture according to an exemplary embodiment of the invention, which uses aspects of HDFS and GPFS. The architecture shows a client node 261 including a HDFS client 221 interacting with a plurality of server nodes 311, 312, 313, . . . , 31*n*. Files are stored in a GPFS using an HDFS client 221 without the HDFS client 221 being aware that a GPFS is used. In an embodiment of the inventive concept, HDFS file Application Program Interfaces (APIs) (e.g., open, create, append, etc.) are used by the HDFS client 221 for writing to files and reading from files. A single POSIX file is created in a GPFS name space, which exposes the same file (zero copy) through a HDFS uniform resource identifier (URI). Transactional workloads can read files through GPFS. File writes are supported through HDFS APIs. The NameNode 301 leverages the fact that it is writing to a shared parallel file system (e.g., a GPFS File Placement Optimizer (GPFS-FPO 320). The files reside in a GPFS namespace for POSIX apps, GPFS tools, etc. The architecture creates a single file in the GPFS namespace and exposes the same file (zero copy) through a HDFS URI (with URI translation). Transactional workloads can read/write files through GPFS and analytical workloads can read/write files through HDFS. At a high level, only a single file exists in a GPFS namespace and this single file is exposed through an HDFS URI to HADOOP applications. A HADOOP client (e.g., 221) wants to read a file. The request first goes to the NameNode 301 to obtain the block IDs and their locations. The NameNode 301 is implemented such that a single file on GPFS gets translated into block locations. The client 221 issues a read request for each block location to respective DataNodes (e.g., 341, 342, 34*n*).

Figure 4:
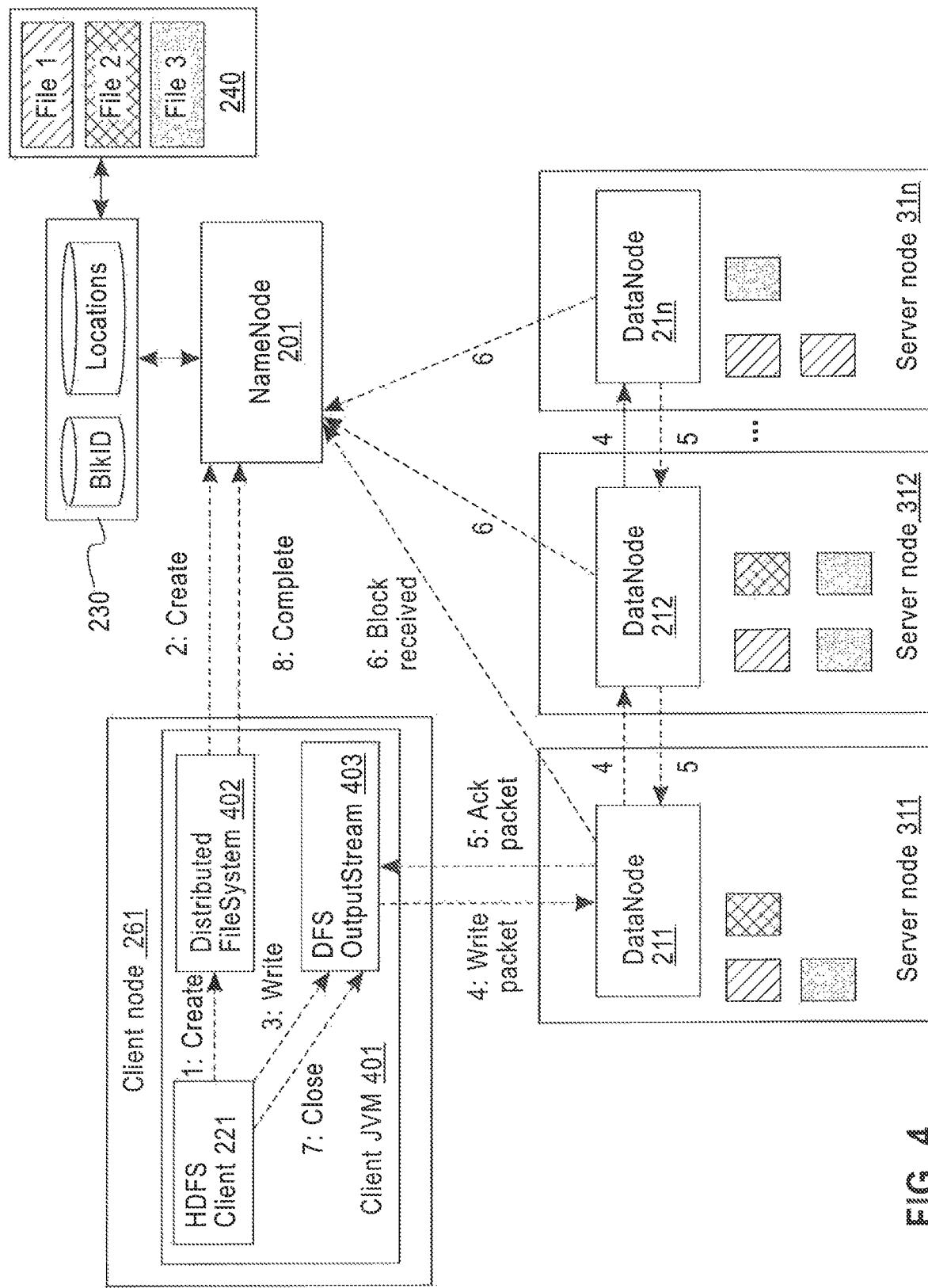
FIG. 4 illustrates HDFS architecture of FIG. 2 being used to write data for reference.

FIG. 4 illustrates an HDFS read/write pipeline prior to making adjustments according to embodiments of the invention. Referring to FIG. 4, a client node 261 that wants to read data from or write data stored on one or more of the DataNodes (e.g., 311, 312, . . . , or 31*n*) makes corresponding requests to the NameNode 201. In response to these requests, the NameNode 201 provides the client node 301 with information indicating a location of one or more corresponding blocks (e.g., the IP address of the particular DataNodes storing the blocks) and information identifying the blocks (e.g., block identifiers indicating locations of the blocks within a given DataNode). The client node 261 then uses the data received from the NameNode 201 to access the data. In this example, the client node 261 includes a client JAVA virtual machine (JVM) 401, which includes the client 221, which interacts with a Distributed File System (DFS) 402 and a DFS output stream 403.

Figure 5:
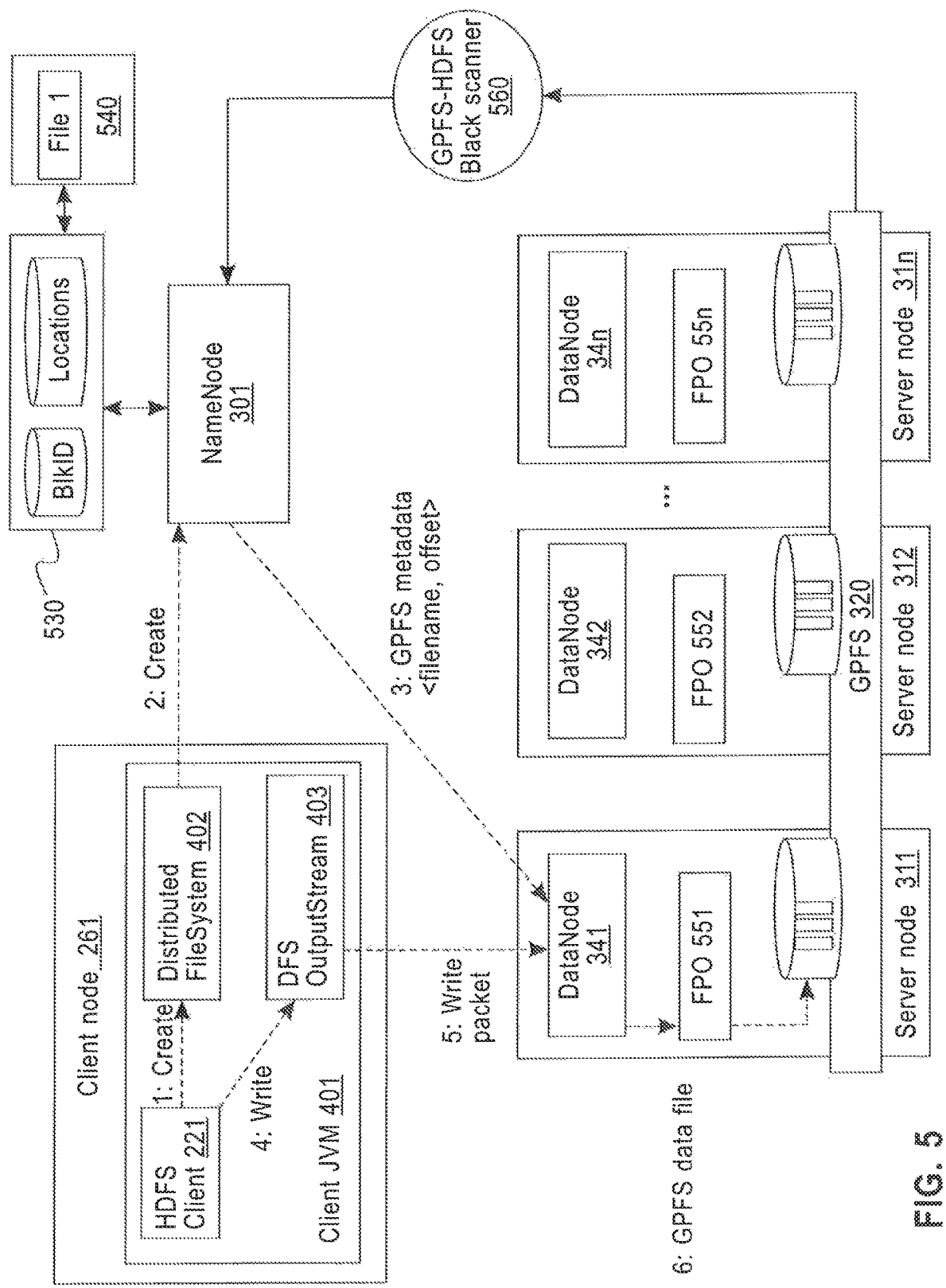
FIG. 5 illustrates an architecture according to an exemplary embodiment of the inventive concept being used to write data.

FIG. 5 illustrates an HDFS-GPFS architecture according to an exemplary embodiment of the invention. The NameNode 301 of FIG. 5 differs from the NameNode 201 of FIG. 4. The NameNode has been modified to send GPFS metadata to the DataNode (e.g., 341) that is involved in a data access request of the client node 261. The GPFS metadata includes information that is used by the DataNode (e.g., 341) to determine a single POSIX file (e.g., its filename) that will be affected by the data access request, and one or more offsets into that single POSIX file. The DataNodes 341-34*n* of FIG. 5 differ from the DataNodes 211-21*n* of FIG. 4. The DataNodes of FIG. 5 have been modified to support GPFS and a file placement optimizer (FPO) (e.g., 551, 552, . . . , 55*n*). The FPO enables a user to specify which DataNode is to be accessed, and to group data into larger sized blocks. For example, the amount of data that can be stored on a single DataNode or a single server can be adjusted.

Additionally, a block scanner 560 is provided that scans the DataNodes 341-34*n* for GPFS files, obtains chunk locations for chunks of the file, and then populates the metadata 530 from the scan. The block scanner 560 is configured to obtain locations (e.g., DataNode name and block addresses) of individual blocks of the GPFS file, create block IDs for the blocks and store this data in the metadata 530. This is possible in a file system such as GPFS FPO that writes data in 'chunks' that are equivalent to HDFS block files. In another embodiment, rather than use a GPFS FPO file system, a GlusterFS filesystem is used that places an entire file on a single DataNode. The block scanner 560 would then return consecutive block locations from the single DataNode to provide the illusion to an HFDS client (e.g., 221) that the file is placed blockwise. The block scanner 560 populates the metadata so that it reflects the location of the blocks and the number of replicas. The NameNode 301 uses the information it receives from the block scanner 560 to update the list of blocks comprising a DFS file and the locations of each replica of each block (referred to as importing). This importing can be performed each time a Hadoop client (e.g., 221) is run in order to get the latest copy of the file, if not the applications would run on the last imported version of the file.

In an exemplary embodiment, at least one other NameNode is present in addition to the first NameNode 301. The additional NameNode(s) function in a manner similar to the first NameNode 301. These multiple NameNodes can be used for load balancing. For example, if the first NameNode 301 is currently handling too many requests to access data of the DataNodes, one of the additional NameNodes can handle the next request from a client.

Figure 6:
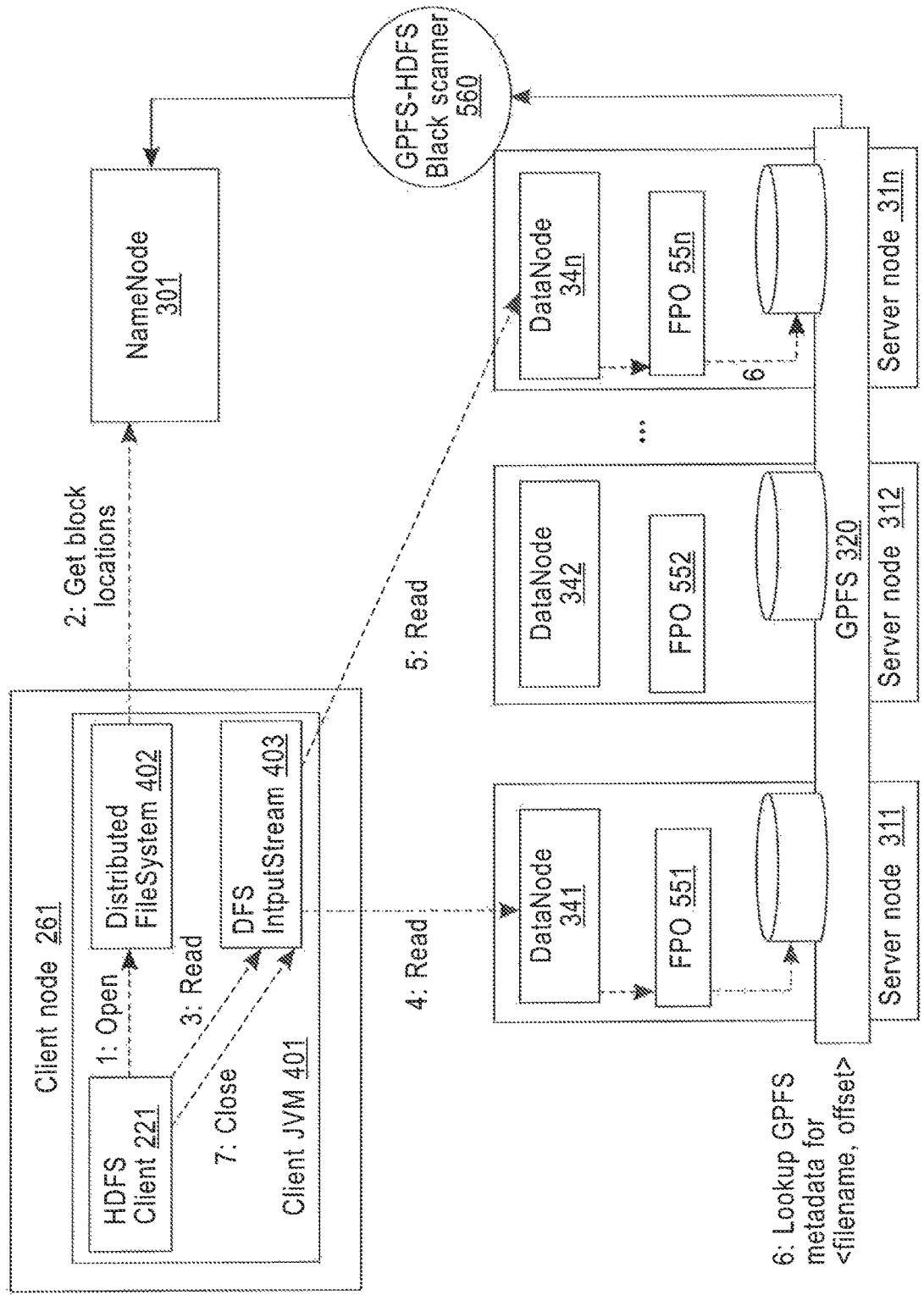
FIG. 6 illustrates an architecture according to an exemplary embodiment of the inventive concept being used to read data.

FIG. 6 illustrates an example of a read operation being performed on the architecture depicted in FIG. 5. A client (e.g., 221) indicates to the NameNode 301 that it wants to read an HDFS file. For example, the client 221 may send to the NameNode 301 an open command along with a parameter indicating the filename of the HDFS file. The NameNode 301 accesses the metadata 530 using the filename of the HDFS file to retrieve a GPFS filename that is associated with the HDFS filename, one or more offsets (e.g., a list offsets) into the GPFS filename, and identifiers of DataNodes storing at those offsets. The offsets were previously set in the metadata 530 by the block scanner 560. The NameNode 301 then sends metadata including the GPFS filename and the offsets to the identified DataNodes. Then for each offset in the list, the NameNode 301 sends a Located Block data structure to the client 221 that includes identifiers of DataNodes storing data at the corresponding offset, and a modified extended data block structure that includes the GPFS filename, an extent (e.g., a block size), and the corresponding offset. Then, for each received Located Block data structure, the client 221 requests from one of the DataNodes identified in the received Located Block data structure, the HDFS file by sending the one DataNode the modified extended data block structure. The one DataNode (e.g., 341) responds to the client 221 with a part of a GFPS file having the GPFS filename by accessing the FPO 551 using the GPFS filename, extent, and offset in the modified extended data block structure received from the client.

Figure 8:
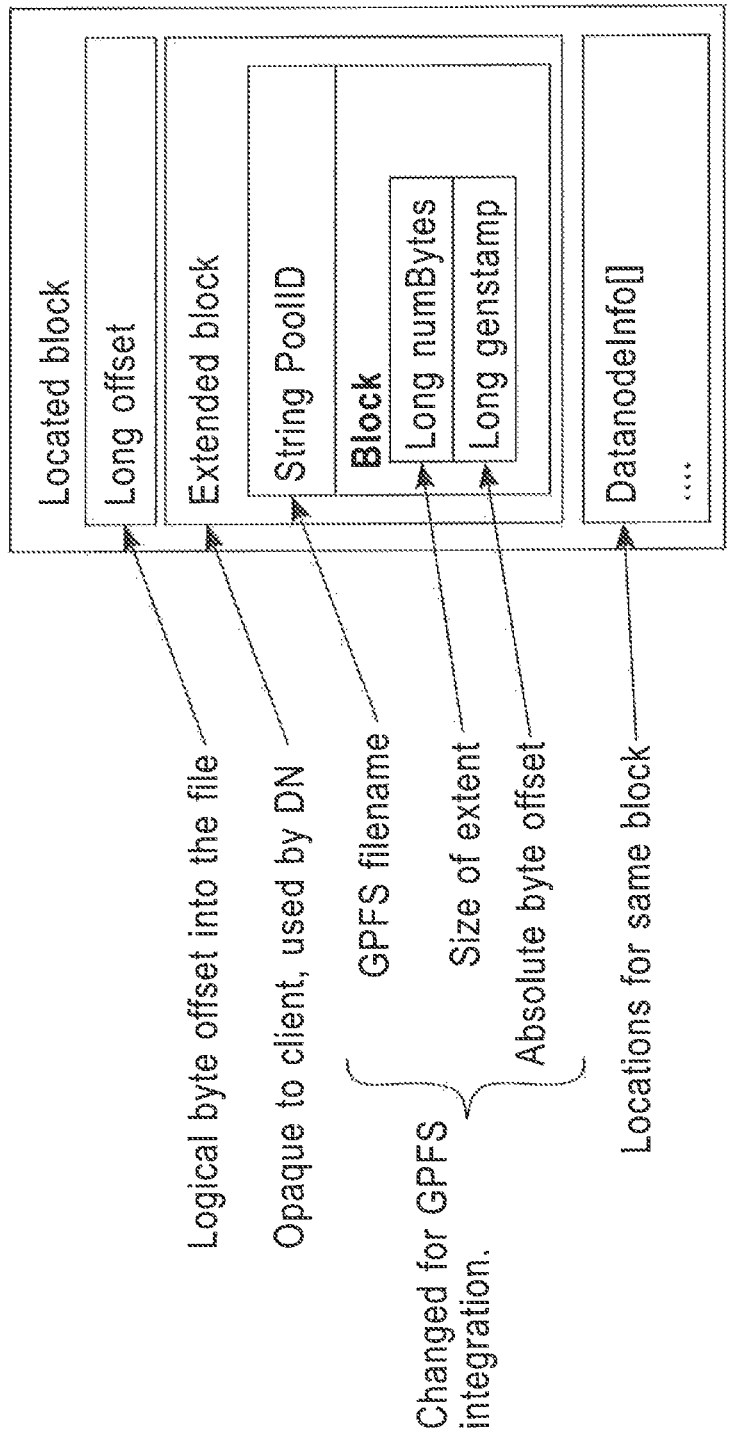
FIG. 8 illustrates an example of modified HDFS block information that is used in an embodiment of the invention.

The modified extended data block structure is a modified version of an original extended block structure used in HDFS. For example, as shown in FIG. 8, the modified extended block structure is arranged in the same manner as the original extended block structure, but some existing fields of the original extended block structure that were originally used to represent first parameters (e.g., block id, number of bytes, generation stamp) are now used to represent second other parameters (e.g., GPFS filename, size of extent, and absolute byte offset). Further, the DataNodes 341-34n of FIG. 5 differ from the DataNodes 211-21n of FIG. 4 in that the DataNodes 341-34n of FIG. 5 are configured to interpret the second parameters whereas the DataNodes 211-21m of FIG. 4 are only configured to interpret the first parameters. In an exemplary embodiment, the DataNodes 341-34n are configured to interpreted both the first and second parameters.

Figure 7:
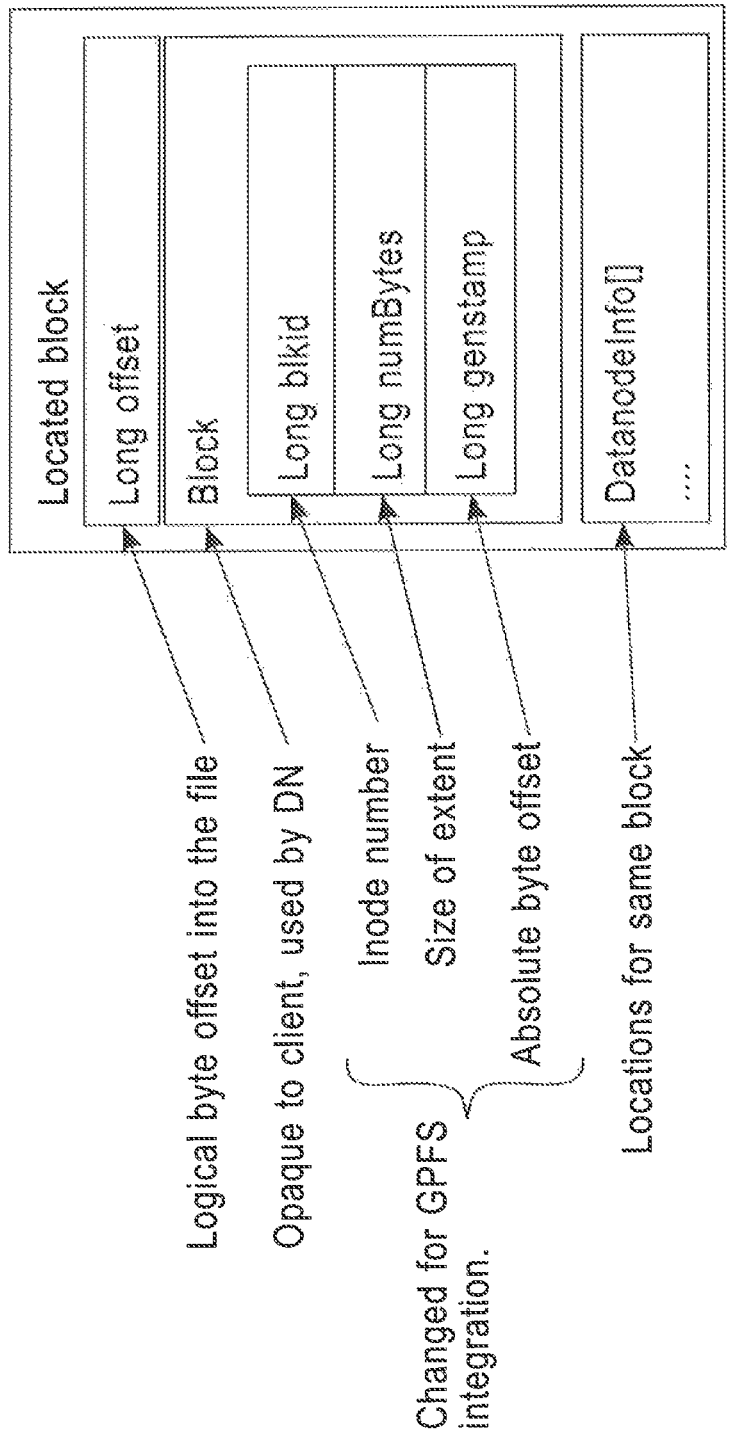
FIG. 7 illustrates an example of modified HDFS block information that is used in an embodiment of the invention.

FIG. 7 illustrates an embodiment of the invention, where the located block data structure that is traditionally sent by a standard HDFS NameNode (e.g., 201) to an HDFS client node 261 is modified by the NameNode 301 according an embodiment of the invention to include different information so that a modified DataNode (e.g., 341) according to an embodiment of the invention can interpret this information to determine a single POSIX file to access and a proper offset into this file. The parameter blkid that is normally used to identify the blockID is used to instead store an Inode number. In a Unix-style file system, the inode number is a data structure used to represent a filesystem object, which is typically a file or a directory. Each inode number stores the attributes and disk block location(s) of the filesystem object's data. The parameter numBytes that is typically used to indicate the number of bytes to access is instead used to store a size of an extent. The extent may be contiguous area of storage reserved for a file in a filesystem, represented as a range. The parameter genstamp that is normally reserved for a timestamp is instead used to store an absolute byte offset. The corresponding DataNode (e.g., 341) can then use the Inode number to determine the corresponding single POSIX file, and the extent and byte offset to determine what part of the POSIX file and how much to access (e.g., read or write).

FIG. 8 illustrates another embodiment of the invention, where the Located Block data structure that is traditionally sent by a standard HDFS NameNode (e.g., 201) to an HDFS client node 241 is modified by the NameNode (e.g., 301) according an embodiment of the invention to include different information so that a modified DataNode (e.g., 341) according to an embodiment of the invention can interpret this information to determine the single POSIX file to access and the proper offset into this file. This embodiment is similar to the embodiment depicted in FIG. 7, except instead of using the blkid to store an inode number, the parameter used to store a string representing the pool ID of a block is used to store the GPFS filename (e.g., the name of the single POSIX file). The corresponding DataNode (e.g., 341) can then use the filename to determine the corresponding single POSIX file, and the extent and byte offset to determine what part of the POSIX file and how much to access (e.g., read or write). Instead of using fields poolID and genStamp to send the block Pool ID (used to identify a namespace) and the generation stamp (used to control block files), they are used to send the file name and the position in the file where the current "block" would begin, respectively.

For a read operation, the LocatedBlock data structure is returned from the NameNode 301 to the client 221 when the client issues a getBlockLocations request. This data structure is to inform the client of the constituent BlockIDs of the file and their respective DataNode locations. For each of these blocks, the client extracts the Extended Block structure and passes it to the DataNode to perform the read. The DataNode (e.g., 341) in an embodiment of the invention receives this modified ExtendedBlock data structure, extracts the filename from the PoolID field and the block offset from the Block's genStamp field and returns "numBytes" worth of data to the client 221.

When the client 221 wants to write an additional block to open a file, it calls addBlock with the filename. This method allocates a new block, and the DataNodes on which this block will be replicated to return this information to the client using the aforementioned LocatedBlock data structure. Similar to the read operation, the NameNode 301 returns a modified LocatedBlock structure indicating the filename and absolute block offset within the filename to the client 221, which is then passed to the DataNode (e.g., 341). The DataNode extracts the filename and the write location from this structure and performs the write operation.

The append functionality would proceed similar to the write, since the addBlock method is called in both cases when a new block is to be added to the file. In the case where append is working on the last partial block of a file, the NameNode 301 returns the LocatedBlock for the last block with the filename and offset set appropriately for the DataNode 301 to start appending to the GPFS file.

In HDFS, read requests go through the DataNode. When the client asks the DataNode to read a file, the DataNode reads that file off the disk and sends the data to the client over a TCP socket. A short-circuit read obtains the file descriptor from the DataNode, allowing the client to read the file directly. This is possible in cases where the client is co-located with the data and used in the FPO mode. In order to support short-circuit reads, the HDFS short-circuit implementation is modified in a BlockReaderLocal class such that the client can request for the file descriptor of the GPFS file that is obtained as part of the LocatedBlock response from the NameNode 301, seek to the proper location in the file using the offset in the genStamp field and proceed with reading the file. However, since the short-circuit read operation bypasses the DataNode, implementing this feature requires client side changes.

At least one embodiment of the invention provides a method and system to enable a Hadoop File System to be POSIX compliant. It uses HDFS file APIs (create, append etc.) for writing to files. The HDFS client (e.g., 221) creates a file by sending a CREATE request to the NameNode (e.g., 301) that responds with a BlockID and the set of DataNodes that would replicate this block. The NameNode (e.g., 301)

contacts the DataNode (e.g., 341) to create a (small) DFS metadata (Filename and offset in order of 10 s of Bytes). The unmodified client (e.g., 221) proceeds as earlier to copy its data on to the DataNodes (e.g., 341 and 342) that are indicated by the NameNode 301. Upon receiving the data from the client, the DataNode creates a POSIX file in a DFS namespace. The File is available in the DFS namespace for POSIX applications and in an HDFS namespace for HADOOP applications. In an embodiment, the File writes are only supported through HDFS APIs. At least one embodiment provides a method that makes files accessible across the two filesystems with a zero-copy. At least one embodiment provides a method that makes files accessible without modifying Hadoop clients (HDFS, HBase, Hive, MapReduce, BigSQL etc.).

Figure 9:
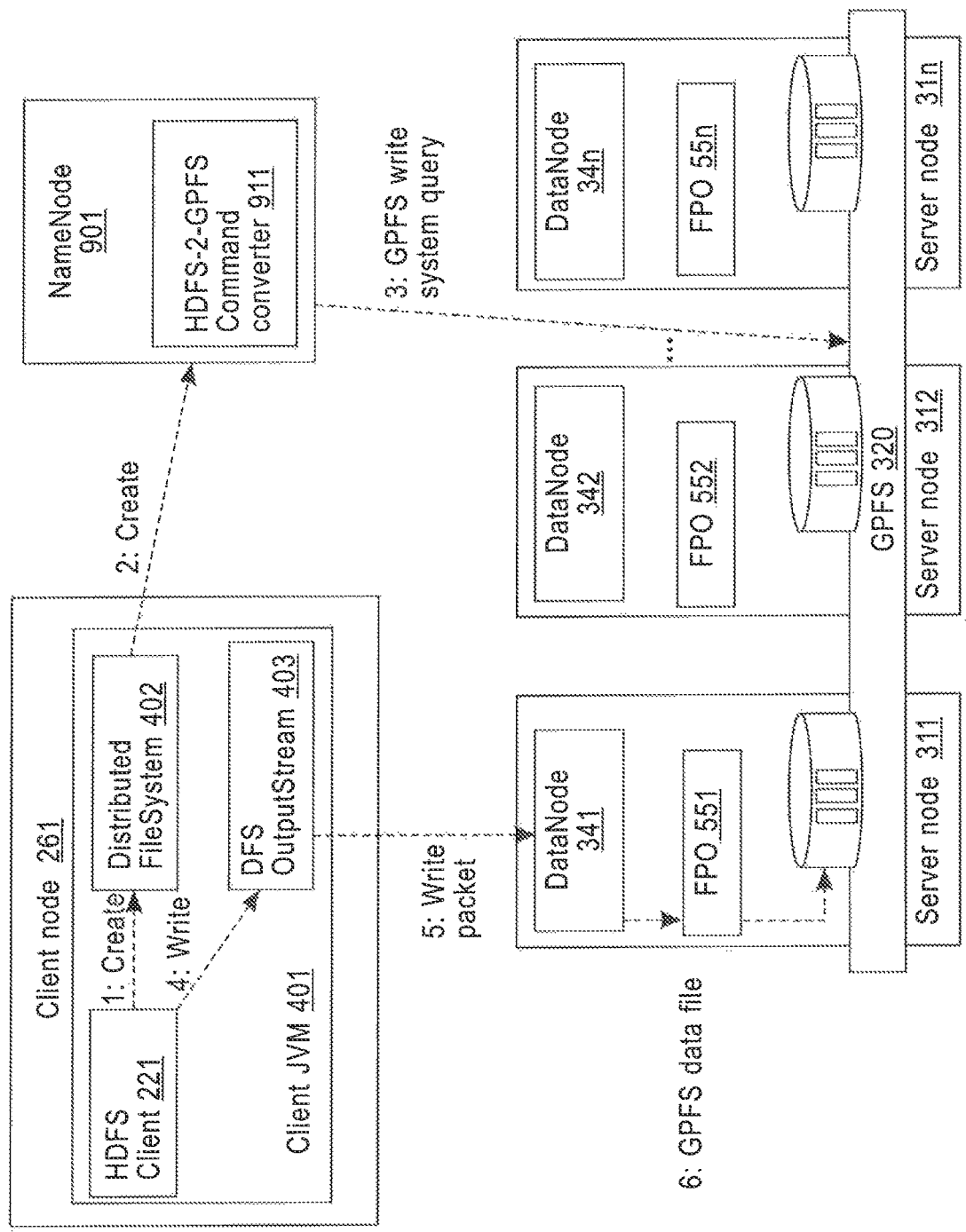
FIG. 9 illustrates an architecture according to an exemplary embodiment of the inventive concept being used to write data.
Figure 10:
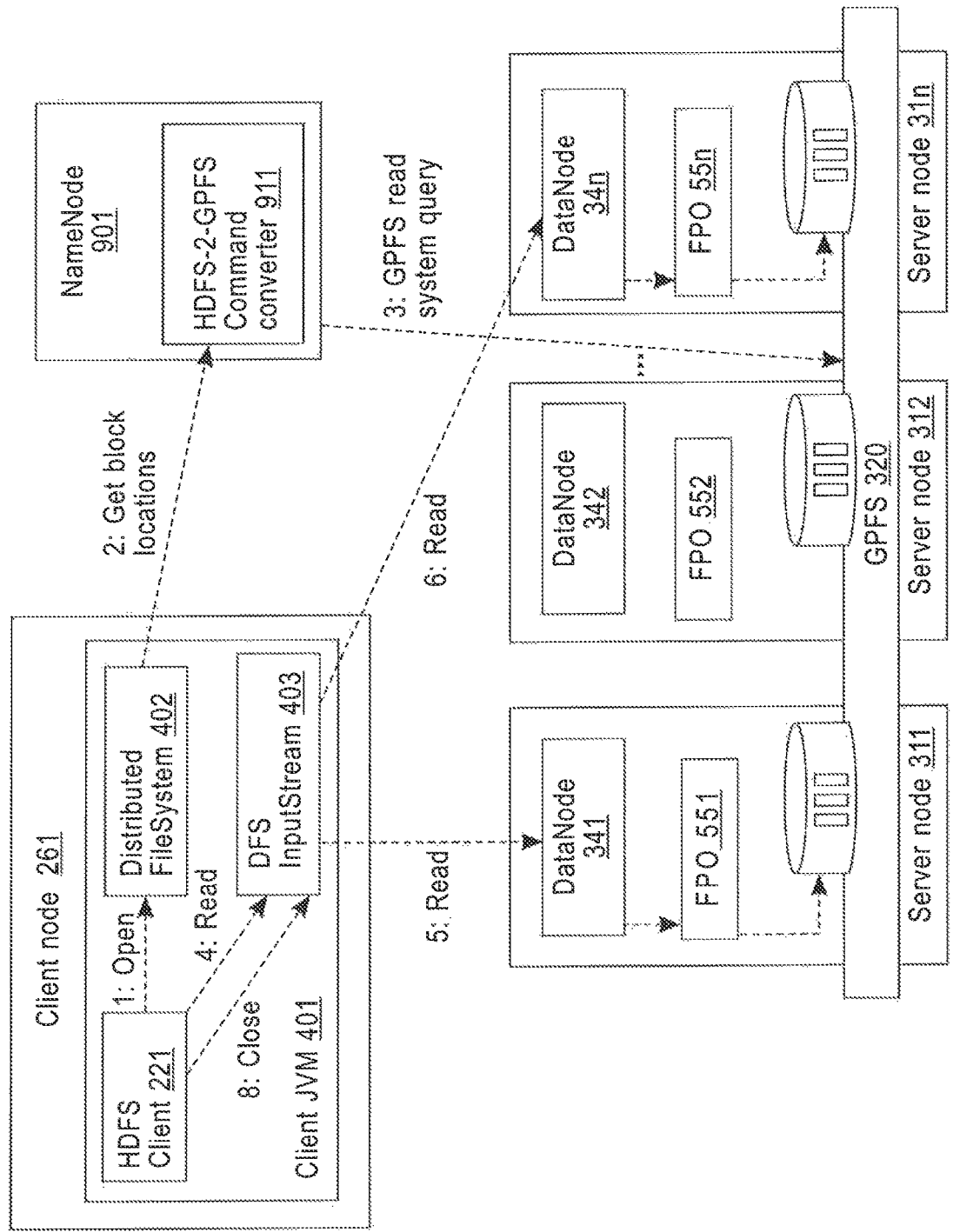
FIG. 10 illustrates an architecture according to an exemplary embodiment of the inventive concept being used to read data

FIGS. 9 and 10 illustrate an HDFS-GPFS architecture according to another exemplary embodiment of the invention, which uses aspects of HDFS and GPFS. The HDFS client 221 uses the HDFS file open API to send a read request or a write request to the NameNode 901. In contrast to the NameNode 301 of FIG. 5, the NameNode 901 does not keep an in-memory copy of the filesystem metadata (e.g., 530) and includes a HDFS-to-GPFS command converter 911 that translates the HDFS API call into a GPFS system query that enables the NameNode 901 to craft a response containing the DataNode addresses to which the blocks would be local. Note that the "blocks" here refer to the GPFS chunks, and from the HDFS perspective, there are no block files. A block is still defined as contiguous bytes (e.g., defined by HDFS block size) and resides on a single DataNode. The NameNode 901 applies the GPFS system query (e.g., a write or a read) to the GPFS 320 to determine identifiers of the DataNodes storing data associated with the read or the write, a GPFS filename of a GPFS file storing the data, an extent, and an offset of the stored data within the GPFS file, and response to the client 221 with a Located Block data structure that includes identifiers of all the DataNodes and the modified extendedblock data structure that includes the GFPS filename, the extent and the offset. The client to NameNode request interfaces are unmodified (e.g., same as those used in FIG. 2). Note that any DataNode on the GPFS cluster is able to respond to the client request to a read or write a block but the FPO can be used to redirect the client requests to nodes that store the block locally, enabling one to exploit data locality. For example, in response to a received Located Block data structure during a read, the client 221 requests from one of the DataNodes identified in the received Located Block data structure, the HDFS file by sending the one DataNode the modified extended data block structure. The one DataNode (e.g., 341) responds to the client 221 with a part of a GFPS file having the GPFS filename by accessing the FPO 551 using the GPFS filename, extent, and offset in the modified extended data block structure received from the client.

The NameNode 201 serves as the metadata store in the HDFS design. It maintains the file system namespace and organization. For each file, the NameNode 201 maintains the replication factor, mapping to its blockIDs and the DataNode locations on which these blocks are replicated. The NameNode 201 also maintains file permissions and ACL settings specific to HDFS files. Several HDFS commands that involve file metadata queries resolve to client to NameNode remote process communications (RPCs) such as ls, chmod, chown, mkdir, etc. In the architecture shown in FIG. 9, there is no metadata maintained at the NameNode 901. The GPFS metadata is the single point at which all file metadata is stored. The NameNode 901 is configured to query the underlying GPFS file metadata. This allows for a stateless NameNode 901 that uses the converter 911 to translate the HDFS query to the corresponding underlying filesystem query. For example, when an HDFS API setpermission is invoked, the converter 911 of the NameNode 901 invokes chmod on the GPFS file. Similarly, the setTimes HDFS call would be translated into the GPFS utimes call. In an alternate embodiment, at least one additional NameNode like NameNode 901 is provided so work can be balanced among the NameNodes.

The DataNode (e.g., 341) informs the NameNode (e.g., 301, 901, etc.) of its existence. The NameNode (e.g., 301, 901) returns its registration ID. This registration ID is a parameter of other DataNode functions. Registration is triggered when a new DataNode is initiated, an old one is re-initiated, or when a new NameNode is initiated. This functionality is retained in the HDFS-GPFS architecture discussed above. Each DataNode (e.g., 341-34n) sends a heartbeat message every few seconds (e.g., periodically). The heartbeat message may include some statistics about capacity and current activity. In response to the heartbeat message, the NameNode (e.g., 301 or 901) returns a list of block oriented commands for a DataNode to execute. These commands primarily consist of instructions to transfer blocks to other DataNodes for replication purposes, or instructions to delete blocks. The NameNode can also command an immediate Block Report from the DataNode, which may be used to recover from a severe problem.

In an HDFS-GPFS architecture according to an exemplary embodiment of the invention, the DataNode heartbeat message is retained, but the NameNode 901 does not respond to the heartbeat message. This ensures that the NameNode 901 is aware of the currently functioning DataNodes, but being stateless, the NameNode 901 does not perform any other filesystem management. A DataNode of FIG. 2 (e.g., 211) periodically (e.g., every hour) reports the blocks it stores to the NameNode 201. However, in the HDFS-GPFS architecture of FIG. 9, the block reports are removed since file replication and recovery are handled by GPFS. A DataNode of FIG. 2 (e.g., 211) reports that it has a new block, either from a Client (e.g., during a file write) or from another DataNode (e.g., during replication). However, in the HDFS-GPFS architecture of FIG. 9, both of these notifications have been removed, but a DataNode-→Client notification is retained when a new block is written from the client.

Due to the design of a stateless NameNode 901, the replication and recovery of blocks has been delegated to GPFS. GPFS provides a write depth policy that indicates a node writing data directs the write to its own node for the first copy, and to the disks in other nodes for the second and third copy (if specified). The data and metadata replication features of GPFS are used to maintain a secondary copy of each file system block, relying on the concept of disk failure groups to control the physical placement of the individual copies. When allocating new file system blocks, GPFS always assigns replicas of the same block to distinct failure groups, and a system administrator can translate an HDFS placement policy into failure groups so a HDFS-GPFS system can retain the enterprise's replication policy. To implement, the GPFS replication policy, the Hadoop replication and recovery components were removed. As described above, the NameNode 901 does not maintain information about BlockIDs that make up a file, or the location of these blocks. The DataNodes of FIG. 9 do not send block reports, either when a new block is written or the periodic reports that indicate to a NameNode if a previously written block is corrupt. The DataNode heartbeat messages that indicate which nodes are alive is retained, and this is still used by the NameNode 901 to maintain a current list of DataNodes. However, these messages are only used to indicate the liveness and not to obtain any filesystem state.

In a shared storage architecture, one or more DataNodes that provide compute capability may not have an attached storage disk and may have access to a shared disk instead. In order to support shared storage architecture, a NameNode (e.g., 301, 901, etc.) according to an embodiment of the invention maintains a mapping from storage IPs to currently running DataNodes. To illustrate, a client that wants to read a file would first look up the block locations using getBlockLocations. A NameNode according to an embodiment of the invention looks up the map and translates the storage IP where the block is stored to the correct compute IP where a DataNode is running. The client requests to read the block from the DataNode specified in LocatedBlock data structure. While this node does not have this data locally, it reads it from the GPFS shared storage and serves it to the client. Similarly, when a client wants to create a file, the NameNode returns a functional DataNode IP based on the block storage policy being used, and the client writes to that DataNode that may have a local or shared storage attached to it. Since HDFS creates only 1 replica, and replication is done internally by GPFS, this write design works correctly.

HDFS implements a permissions model for files and directories that shares much of the POSIX model with each file and directory associated with an owner and group. When a file or directory is created, its owner is the user identity of the client process, and its group is the group of the parent directory (the BSD rule). The NameNode maintains the permissions for files and directories in the filesystem. Each file or directory operation passes the full path name to the name node, and the permissions checks are applied along the path for each operation. The GPFS file permissions are based on the POSIX model, and as a result, the permissions model in HDFS is fully supported by GPFS underneath. When a Hadoop process creates a file (or directory), an embodiment of the invention directly maps the user and group permission settings to the corresponding GPFS file (or directory). When a file needs to be read (by either a remote or a short circuit client), the client passes the full path name to the NameNode, and the HDFS permissions checks are translated into underlying GPFS permission checks and applied along the path for each operation. In an embodiment of the HDFS-GPFS architecture support two modes of operation to determine the user's identity. The first is authentication in simple mode which is the default, non-secure mode in which RPCs are not encrypted and all users can submit jobs to the Hadoop cluster. Whether users can read/write a file depends on the traditional Linux/Unix permission control. The second is authentication in a Kerberos mode that can be used to enable both server side and client side authentication, and hadoop.rpc.protection can be used to encrypt the RPC channel. Further, a delegated NameNode Token can be used to reduce the performance impact from Kerberos and reduce the loads in the Kerberos Key Distribution Center (KDC) server.

In an embodiment of the invention, the HDFS-GPFS architecture has two types of daemons: NameNode and DataNode. Both these daemons can only be started as root user as certain file operations, such as setPermissions and setOwner in Hadoop distributed file system API need root privileges to be able to run on GPFS. This is one of the main deviations from Hadoop's security model, where a regular user can start a Hadoop cluster and become a superuser of that cluster. In order to prevent security violations, an embodiment of the invention requires that a superuser start the server processes in HDFS-GPFS. In Hadoop, the superuser is the user with the same identity as the NameNode process itself. In an embodiment of the invention, this user is always the root user. A super-user group can be configured such that all users of that group are the cluster's super-users. In HDFS-GPFS, when a Hadoop super-user is configured, all operations for users of that group will be done under root context. In embodiment of the invention, the HDFS-GPFS cluster has a hard-coded base directory that only a GPFS root user can edit, so a non-root user is not able to become a superuser of any Hadoop cluster on GPFS. For non-Hadoop super users, when HDFS-GPFS receives their RPC requests from HDFS clients, the NameNode creates new threads, calls setfsuid/setfsgid to change the user/group id of the threads to the client user's uid/gid, and then the request is handled.

Embodiments of the invention are applicable to database applications (e.g., DB2, ORACLE RAC, SAP), digital media (e.g., animation, broadcasting, video surveillance), highly available scalable file storage (e.g., user file storage, multi-site installations, disaster recover), web applications (e.g., email services, web server farm, online data storage), grid applications (e.g., scientific computing, life sciences, analytics).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A distributed file system (DFS) configured to store data in a General Parallel File system (GPFS) and interface with a Client Node configured to interface with a HADOOP Distributed File System (HDFS), the DFS comprising:
   a Name Node; and
   a plurality of Data Nodes comprising the GPFS,
   wherein the Name Node is configured to receive a request from the Client Node to access data within an HDFS file, the request including an HDFS filename of the HDFS file,
   wherein the Name Node is further configured to access first metadata using the HDFS filename to retrieve a GPFS filename of a GPFS file and a plurality of offsets into the GPFS file, and identifiers of the Data Nodes storing data of the GPFS file at the offsets,
   wherein the Name Node is further configured to send for each of the offsets, a first data structure to the Client Node that includes a corresponding one of the identifiers and a second data structure that includes the GPFS filename, a block size, and the corresponding offset,
   wherein the Client Node is configured to request for each of the received first data structures, data of the HDFS file by sending the corresponding second data structure to the data node associated with the offset within the corresponding second data structure, and
   wherein each of the data nodes are configured to respond to the Client Node for each of the received second data structure with part of the GPFS file using the GPFS filename, the block size, and the offset in the corresponding received second data structure.

2. The DFS of claim 1, further comprising a block scanner that scans the Data Nodes for GPFS files to obtain locations for blocks of the GPFS files, and then populates the first metadata based on the scan.

3. The DFS of claim 2, wherein block scanner populates the first metadata to indicate locations of replicas of the blocks.

4. The DFS of claim 1, wherein when the Name Node is handling too many requests to access data of the Data Nodes, a second Name Node of the DFS is configured to handle a next request from the Client Node.

5. The DFS of claim 1, wherein the second data structure is a modified version of an extended block structure used in HDFS.

6. The DFS of claim 5, where the second data structure comprises first, second and third fields, each of the Data Nodes is configured to interpret the first field as a file name, the second field as a block size, and the third field as an offset, and a Data Node of a GPFS system is configured to interpret the first field as an identifier of a namespace, the second field as a number of bytes, and the third field as timestamp.

7. The DFS of claim 1, wherein the GPFS file is a Portable Operating System Interface (POSIX) file.

8. A method of operating a distributed file system (DFS) storing data in a General Parallel File System (GPFS) to enable a Client Node configured to interface with a HADOOP Distributed File System (HDFS) to access the GPFS, the method comprising:

accessing, by a Name Node of the DFS, first metadata using an HDFS filename received in a request from the Client Node to access data within an HDFS file to retrieve a GPFS filename of a GPFS file and a plurality of offsets into the GPFS file, and identifiers of the Data Nodes of the DFS storing data of the GPFS file at the offsets; and sending, by the Name Node, for each of the offsets, a first data structure to the Client Node that includes a corresponding one of the identifiers and a second data structure that includes the GPFS filename, a block size, and the corresponding offset, wherein the Client Node is configured to request for each of the received first data structures, data of the HDFS file by sending the corresponding second data structure to the data node associated with the offset within the corresponding second data structure, and wherein each of the data nodes are configured to respond to the Client Node for each of the received second data structure with part of the GPFS file using the GPFS filename, block size, and offset in the corresponding received second data structure.

9. The method of claim 8, further comprising:

performing a scan of the Data Nodes for GPFS files to obtain locations for blocks of the GPFS files; and populating the first metadata based on the scan.

10. The method of claim 9, wherein performing the scan populates the first metadata to indicate locations of replicas of the blocks.

11. The method of claim 8, wherein when the Name Node is handling too many requests to access data of the Data Nodes, a second Name Node of the DFS handles a next request from the Client Node.

12. The method of claim 8, wherein the second data structure is a modified version of an extended block structure used in HDFS.

13. The method of claim 12, where the second data structure comprises first, second and third fields, each of the Data Nodes is configured to interpret the first field as a filename, the second field as a block size, and the third field as an offset, and a Data Node of a GPFS system is configured to interpret the first field as an identifier of a namespace, the second field as a number of bytes, and the third field as timestamp.

14. The method of claim 8, wherein the GPFS file is a Portable Operating System Interface (POSIX) file.

* * * * *